United States Patent
Cheng et al.

(10) Patent No.: US 8,531,502 B2
(45) Date of Patent: Sep. 10, 2013

(54) METHOD, DEVICE AND SYSTEM FOR PRESENTING VIRTUAL CONFERENCE SITE OF VIDEO CONFERENCE

(75) Inventors: Hong Cheng, Shenzhen (CN); Jiaoli Wu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 65 days.

(21) Appl. No.: 13/409,640

(22) Filed: Mar. 1, 2012

(65) Prior Publication Data

US 2012/0162355 A1 Jun. 28, 2012

Related U.S. Application Data

(63) Continuation of application No. PCT/CN2010/075022, filed on Jul. 7, 2010.

(30) Foreign Application Priority Data

Sep. 1, 2009 (CN) .......................... 2009 1 0161931

(51) Int. Cl.
*H04N 7/15* (2006.01)

(52) U.S. Cl.
CPC ...................................... *H04N 7/15* (2013.01)
USPC .................. 348/14.08; 348/14.09; 348/14.12

(58) Field of Classification Search
CPC .. H04L 12/1827; H04M 3/563; H04M 3/567; H04N 7/15; H04N 7/157
USPC .................. 348/14.01–14.16; 370/260–261; 709/204; 715/753
See application file for complete search history.

(56) References Cited

U.S. PATENT DOCUMENTS 6,559,863 B1   5/2003   Megiddo

2005/0066001 A1 * 3/2005 Benco et al. .................. 709/204
2006/0092269 A1 * 5/2006 Baird et al. ................ 348/14.08
2006/0168529 A1   7/2006 Rokosz et al.
2007/0219981 A1   9/2007 Takaai et al.

FOREIGN PATENT DOCUMENTS

| CN | 1433222 A | 7/2003 |
| CN | 1620133 A | 5/2005 |
| CN | 1794642 A | 6/2006 |
| CN | 101031063 A | 9/2007 |

(Continued)

OTHER PUBLICATIONS

Extended European Search Report issued in corresponding European Patent Application No. 10813304.2, mailed Feb. 7, 2013.

(Continued)

*Primary Examiner* — Melur Ramakrishnaiah
(74) *Attorney, Agent, or Firm* — Brinks Hofer Gilson & Lione

(57) ABSTRACT

A method for presenting a virtual conference site of a video conference is disclosed in the present invention. The method include: receiving preset virtual conference site attributes and determining one virtual conference site attribute therefrom, where the virtual conference site includes at least two conference terminals; determining a virtual conference site control mode; acquiring, according to the determined virtual conference site attribute and the virtual conference site control mode, one virtual conference site presentation mode in preset virtual conference site presentation modes, and presenting a virtual conference site in the acquired virtual conference site presentation mode. A virtual conference site preset apparatus, a media processing device, a video conference terminal and a video conference system are also disclosed in the present invention. By utilizing the present invention, a conference control mode may be simplified, and the experience of video conference participators may be improved.

18 Claims, 13 Drawing Sheets

(56) References Cited

FOREIGN PATENT DOCUMENTS

| | | |
|---|---|---|
| CN | 101083752 A | 12/2007 |
| EP | 0574138 A1 | 12/1993 |
| JP | 2001-339799 A | 2/2001 |
| KR | 20030050506 A | 6/2003 |
| WO | WO 2005017674 A2 | 2/2005 |

OTHER PUBLICATIONS

Office Action issued in corresponding Chinese Patent Application No. 200910161931.9, mailed Mar. 27, 2013.

International Search Report mailed Oct. 21, 2010, for related PCT Patent Application No. PCT/CN2010/075022.

Written Opinion of the International Searching Authority mailed Oct. 21, 2010, for related PCT Patent Application No. PCT/CN2010/075022.

Office Action issued in corresponding Chinese Patent Application No. 200910161931.9, mailed Aug. 3, 2012.

Office Action issued in corresponding Chinese Patent Application No. 200910161931.9, mailed Nov. 9, 2012.

* cited by examiner

METHOD, DEVICE AND SYSTEM FOR PRESENTING VIRTUAL CONFERENCE SITE OF VIDEO CONFERENCE

CROSS-REFERENCE TO RELATED APPLICATIONS

This application is a continuation of International Application No. PCT/CN2010/075022, filed on Jul. 7, 2010, which claims priority to Chinese Patent Application No. 200910161931.9, filed on Sep. 1, 2009, both of which are hereby incorporated by reference in their entireties.

FIELD OF THE INVENTION

The present invention relates to the fields of communications and computer technologies, and in particular, to a method, device and system for presenting a virtual conference site of a video conference.

BACKGROUND OF THE INVENTION

A common conference system, that is, a conventional video conference system, is a system providing audio and video communications on the basis of H.323, H.320, and SIP (Session Initial Protocol) standard protocols. The common conference site typically uses 1 path of video input and 1 path of video output.

A telepresence conference system, that is, a new remote presentation system differs from the common conference system, is a video conference system of high experience. The telepresence conference site performs multi-screen output through multiple paths of camera, so as to provide more realistic video communication effect.

Virtual conference sites may be classified into different types of conference sites on the basis of geography or according to functions of conference participators, and a set of common conference sites and telepresence conference sites of the same type is referred to as a virtual conference site. For example, in a multi-point video conference, if classification is made according to geography, three sub-conference sites of development, customer service, and marketing in Shanghai may be virtualized into a Shanghai virtual conference site.

A multi-picture technology refers to that a video conference system supports combining multiple paths of pictures entering the conference with different or the same protocol and rate into the same one (or several) picture, encodes the picture again by using a rate and protocol required by the conference, and sends the picture to any one or several terminals participating the conference.

During the implementation of the present invention, the inventor finds that the prior art has the following defects:

In a hybrid conference including the common conference site and the telepresence conference site, multi-path broadcast transmission for pictures of a certain type of virtual conference site (including multiple sub-conference sites) currently adopts a conference control mode of switching virtual conference sites one by one. This conference control mode not only has a complicated operation, but also has a problem that the multiple virtual conference sites are broadcasted sequentially and cannot be well presented, so it is impossible to provide a good experience for participators of the video conference.

SUMMARY OF THE INVENTION

An embodiment of the present invention provides a method for presenting a virtual conference site of a video conference, for simplifying a conference control mode, and improving the presentation of a video conference and the experience of participators. The method includes:

receiving preset virtual conference site attributes, and determining one virtual conference site attribute therefrom, where the virtual conference site includes at least two conference terminals;

determining a virtual conference site control mode; and according to the determined virtual conference site attribute and the virtual conference site control mode, acquiring one virtual conference site presentation mode in preset virtual conference site presentation modes, and presenting a virtual conference site in the acquired virtual conference site presentation mode.

An embodiment of the present invention further provides a method for presenting a virtual conference site of a video conference, for simplifying a conference control mode, and improving the presentation of a video conference and the experience of participators. The method includes:

acquiring virtual conference site attributes preset by a virtual conference site preset apparatus, where the virtual conference site includes at least two conference terminals;

according to the preset virtual conference site attributes, and under various preset virtual conference site control modes, presetting virtual conference site presentation modes; and sending to a video conference terminal the preset virtual conference site attributes and one virtual conference site presentation mode requested by the video conference terminal for acquisition in the preset virtual conference site presentation modes.

An embodiment of the present invention further provides a virtual conference site preset apparatus, for simplifying a conference control mode, and improving the experience of participators of a video conference. The apparatus includes:

a first presetting module, configured to preset virtual conference site attributes, where the virtual conference site includes at least two conference terminals;

a second presetting module, configured to, according to the preset virtual conference site attributes, and under various preset virtual conference site control modes, preset virtual conference site presentation modes; and a sending module, configured to send the preset virtual conference site attributes and one virtual conference site presentation mode requested by a video conference terminal for acquisition in the preset virtual conference site presentation modes.

An embodiment of the present invention further provides a media processing device, for simplifying a conference control mode, and improving the experience of participators of a video conference. The media processing device includes:

an acquiring module, configured to acquire virtual conference site attributes preset by a virtual conference site preset apparatus, where the virtual conference site includes at least two conference terminals;

a presetting module, configured to, according to the preset virtual conference site attributes, and under various preset virtual conference site control modes, preset virtual conference site presentation modes; and a sending module, configured to send to a video conference terminal the preset virtual conference site attributes and one virtual conference site presentation mode requested by the video conference terminal for acquisition in the preset virtual conference site presentation modes.

An embodiment of the present invention further provides a video conference terminal, for simplifying a conference control mode, and improving the experience of participators of a video conference. The video conference terminal includes:

a first determining module, configured to receive preset virtual conference site attributes, and determine one virtual conference site attribute therefrom, where the virtual conference site includes at least two conference terminals;

a second determining module, configured to determine a virtual conference site control mode; and a presenting module, configured to, according to the determined virtual conference site attribute and the virtual conference site control mode, acquire one virtual conference site presentation mode in preset virtual conference site presentation modes, and present a virtual conference site in the acquired virtual conference site presentation mode.

An embodiment of the present invention further provides a video conference system, for simplifying a conference control mode, and improving the experience of participators of a video conference. The system includes:

a virtual conference site preset apparatus, configured to: preset virtual conference site attributes, where the virtual conference site includes at least two conference terminals; according to the preset virtual conference site attributes, and under various preset virtual conference site control modes, preset virtual conference site presentation modes; send the preset virtual conference site attributes; receive a request of a video conference terminal acquiring one virtual conference site presentation mode in the preset virtual conference site presentation modes forwarded by a media processing device, and send one virtual conference site presentation mode in the preset virtual conference site presentation modes requested by the video conference terminal;

the media processing device, configured to: receive and forward to the video conference terminal the preset virtual conference site attributes sent by the virtual conference site preset apparatus; receive a request of acquiring one virtual conference site presentation mode in the preset virtual conference site presentation modes sent by the video conference terminal and forward it to the virtual conference site preset apparatus; and forward the virtual conference site presentation mode sent by the virtual conference site preset apparatus; and the video conference terminal, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode forwarded by the media processing device, and present a virtual conference site in the received virtual conference site presentation mode.

An embodiment of the present invention further provides a video conference system, for simplifying a conference control mode, and improving the experience of participators of a video conference. The system includes:

a virtual conference site preset apparatus, configured to preset virtual conference site attributes, where the virtual conference site includes at least two conference terminals; and send the preset virtual conference site attributes;

a media processing device, configured to: receive the preset virtual conference site attributes and forward them to a video conference terminal; according to the preset virtual conference site attributes, and under various preset virtual conference site control modes, preset virtual conference site presentation modes; receive a request of a video conference terminal acquiring one virtual conference site presentation mode in the preset virtual conference site presentation modes, and send one virtual conference site presentation mode in the preset virtual conference site presentation modes requested by the video conference terminal; and the video conference terminal, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode sent by the media processing device, and present a virtual conference site in the received virtual conference site presentation mode.

In the embodiments of the present invention, for the virtual conference site including at least two conference terminals, receive preset virtual conference site attributes and determine one virtual conference site attribute therefrom, where the virtual conference site includes at least two conference terminals; determine a virtual conference site control mode; according to the determined virtual conference site attribute and the virtual conference site control mode, acquire one virtual conference site presentation mode in the preset virtual conference site presentation modes, and present a virtual conference site in the acquired virtual conference site presentation mode; thereby using the virtual conference site attribute to provide a conference control mode in which pictures of the virtual conference site are switched integrally. The operation is simple and convenient, so that the virtual conference site may be well presented, thereby providing a good experience for participators of the video conference.

BRIEF DESCRIPTION OF THE DRAWINGS

To illustrate the technical solutions in the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art may further derive other drawings according to these accompanying drawings without creative efforts. In the drawings.

DETAILED DESCRIPTION OF THE EMBODIMENTS

In order to make objectives, technical solutions and advantages of embodiments of the present invention clearer, the embodiments of the present invention are further illustrated in detail below with reference to the accompanying drawings. Here, the exemplary embodiments of the present invention and illustration thereof are used to explain the present invention, but are not intended to limit the present invention.

Figure 1:
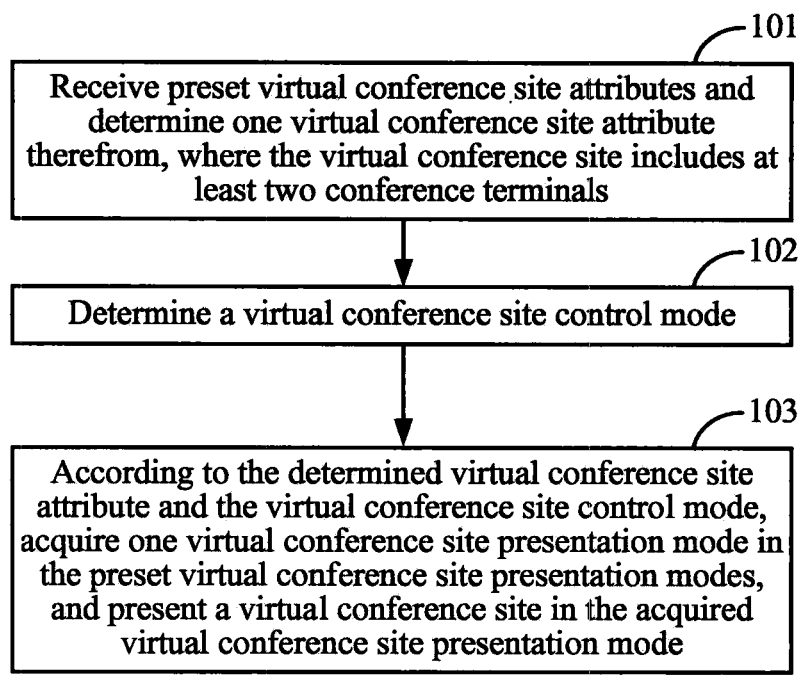
FIG. 1 is a flow chart of a control method for a virtual conference site of a video conference in an embodiment of the present invention.

The virtual conference site of the video conference involved in the embodiments of the present invention needs to include at least two conference terminals. As shown in FIG. 1, in an embodiment of the present invention, a flow of a control method for a virtual conference site of a video conference is as follows:

Step 101: Receive preset virtual conference site attributes and determine one virtual conference site attribute therefrom, where the virtual conference site includes at least two conference terminals.

Step 102: Determine a virtual conference site control mode.

Step 103: According to the determined virtual conference site attribute and the virtual conference site control mode, acquire one virtual conference site presentation mode in the preset virtual conference site presentation modes, and present a virtual conference site in the acquired virtual conference site presentation mode.

It can be seen from the flow shown in FIG. 1 that, in the embodiment of the present invention, for the virtual conference site including at least two conference terminals, through performing the foregoing control method, a conference control mode in which pictures of the virtual conference site are switched integrally is provided by using the virtual conference site attribute, thereby simplifying the processing mode of the virtual conference site, and therefore, virtual conference site IDs included in the virtual conference site attribute may be displayed correctly at both the telepresence conference site side and the common terminal conference site side. Therefore, unified operation and management may be performed for the virtual conference site, and operations including selecting a conference site and broadcasting a conference site may be well simplified, thereby reducing the operation and maintenance of users, so that the virtual conference site may be well presented, giving a good experience for participators of the video conference.

Specific embodiments of the control method for the virtual conference site of the video conference shown in the flow of FIG. 1 are introduced in detail below. A network structure of a video conference involved in this embodiment is illustrated by taking one application scenario shown in FIG. 2, FIG. 3, and FIG. 4 as an example, and the flow shown in FIG. 1 is also applicable to other similar network structures of the video conference.

Figure 2:
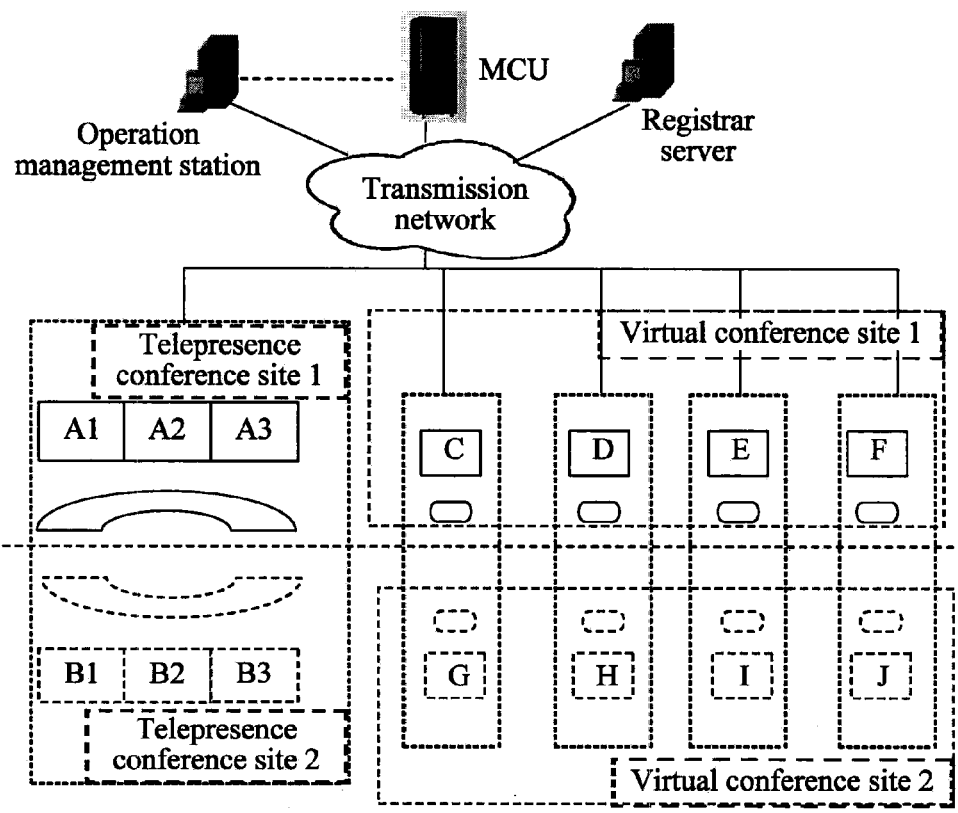
FIG. 2 is a schematic diagram of networking which converges a multi-point telepresence conference and a conventional video conference in an embodiment of the present invention.

As shown in FIG. 2, in a network where a multi-point telepresence conference is converged with a conventional video conference, a multipoint control unit (MCU), an operation management station, a registrar server, a transmission network, a telepresence conference site, and a common conference site are included. The registrar server is optional. The multi-point control unit is an embodiment of the media processing device, and the media processing device involved in the embodiment of the present invention may be a multi-point control unit, and may also be another media processing device, such as a media resource server (MRS). In the embodiment of the present invention, the multi-point control unit is taken as an example for illustration.

Figure 3:
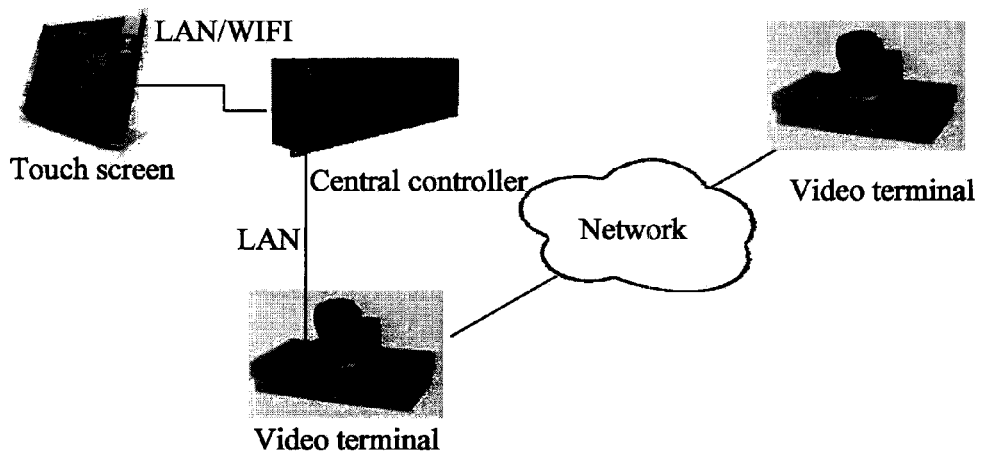
FIG. 3 is a schematic diagram of a conference control member at a telepresence conference site side in an embodiment of the present invention.

Main conference control members at the telepresence conference site include: a central control system, a central control system touch screen, and a terminal, where the central control system may also be referred to as a central controller. As shown in FIG. 3, uniform management may be performed for the terminal of each conference site through the touch screen of the central control system at the conference site side, and the multi-point conference control may be operated on the touch screen of the central control system and may also be operated directly on a certain terminal. The central control system communicates with the terminal through a serial port and in an IP mode.

Figure 4:
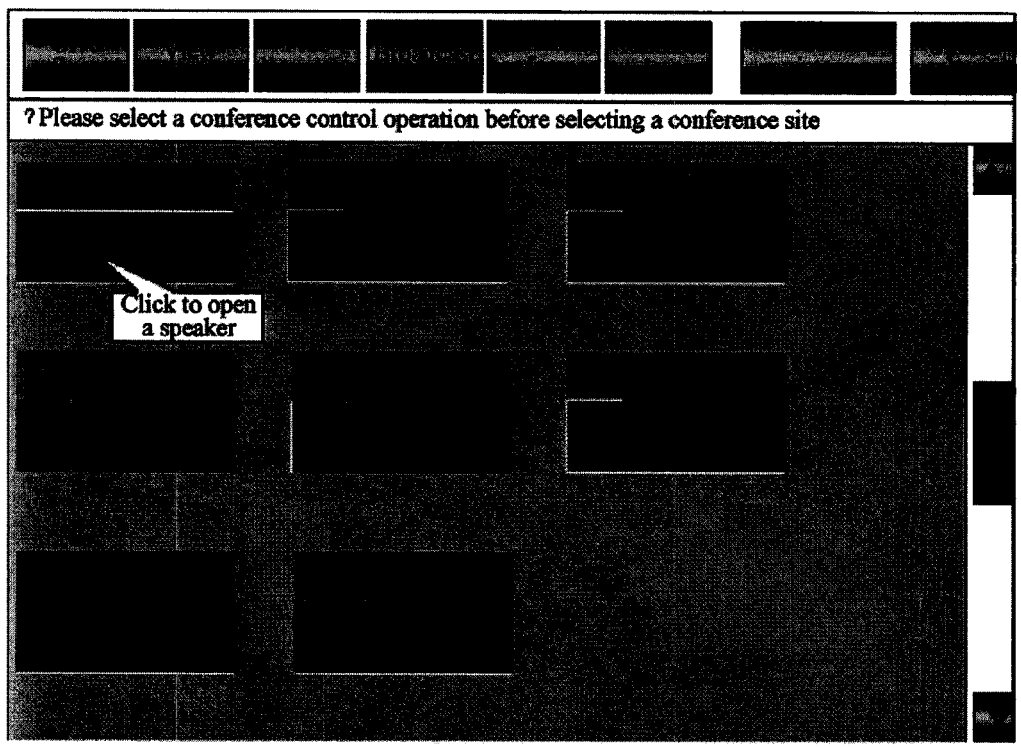
FIG. 4 is a schematic diagram of a conference control operation interface at a conference site side in an embodiment of the present invention.

FIG. 4 is a schematic diagram of a conference control operation interface at the conference site. In a multi-point conference, for the virtual conference site, conference control operations at the conference site side mainly includes: displaying a conference site list, updating a conference site list, broadcasting a conference site, giving floor to a conference site, selecting a conference site, free discussion, adding a conference site, ending a conference, requesting/releasing chair, mute, mute a microphone, calling a conference site, hanging up a conference site, screen image switching, and the like.

In an embodiment, when the method for presenting a virtual conference site of a video conference shown in FIG. 1 is specifically implemented, a virtual conference site preset apparatus is required to preset virtual conference site attributes; and the preset virtual conference site attributes are forwarded to a video conference terminal through a media processing device. The virtual conference site preset apparatus may be an operation management station, and may also be a central control system.

For example, on the operation management station, covering cascading situation of conference terminals, the preset virtual conference site attributes include an identity (ID) of a virtual conference site, an identity of a bound terminal in the virtual conference site, and the like. The identity of the terminal in the virtual conference site may be an MT (MCU Terminal, MCU terminal) number of the terminal or an alias of the terminal in the virtual conference site, and here, the alias may be in a form of number, email, or ID. Then, summon a conference to deliver attributes of a virtual conference site to an MCU, and definitely, during application, the MCU may also acquire the virtual conference site attributes actively. For example, the MCU may send a request to the operation management station, requesting for acquiring virtual conference site attributes. For the telepresence conference site, when the MT number is delivered, special processes may be performed, that is, deliver an MT number of a main terminal of the conference site, and after the delivery, the MCU delivers the virtual conference site attributes, which including a binding relationship of the virtual conference sites at the same time, for example, a virtual conference site 1 (ID) M1 T1, M2 T2, M1 T3, a virtual conference site 2 (ID) M1 T4, M1 T5, M3 T5. That is, the virtual conference site 1 correspondingly includes a conference site 1 under an MCU1, a conference site 2 under an MCU2, and a conference site 3 under the MCU1. The virtual conference site 2 correspondingly includes a conference site 4 under the MCU1, a conference site 5 under the MCU1, and a conference site 5 under an MCU3.

For another example, virtual conference site attributes may also be preset on an operation interface of the central control system at the conference site side, and then the information is sent to the network side of the conference system through a site call signaling, such as GK (Gatekeeper, gatekeeper), and is forwarded to the MCU, and finally the MCU summons a conference that includes multi-point virtual conference sites. Definitely, a virtual conference site preset apparatus may also be used to preset the virtual conference site attributes, and the forgoing operation management station and the central control system are specific examples of the apparatus.

Figure 5:
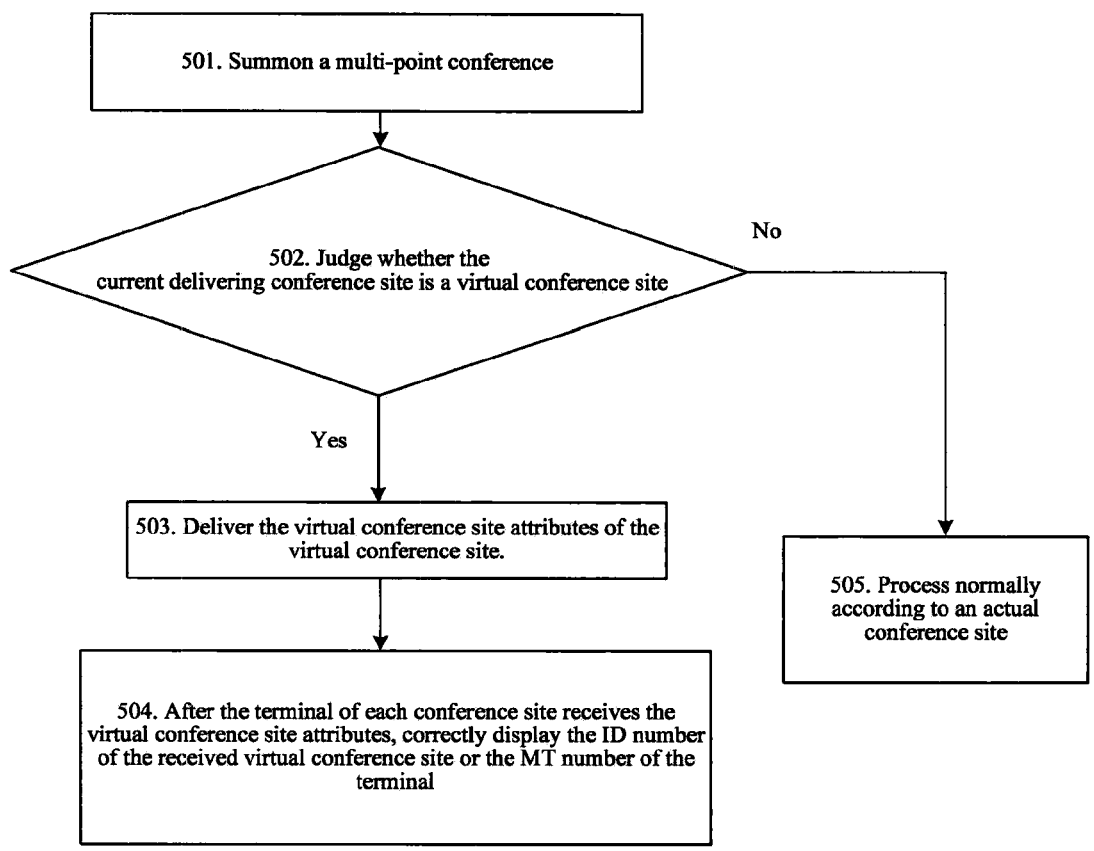
FIG. 5 is a schematic diagram of delivering process of a conference site list in an embodiment of the present invention.

After the conference is summoned up, for a virtual conference site, the MCU delivers the virtual conference site attributes for each video conference terminal, where the MCU may make a judgment according to whether the current conference site is a virtual conference site, and deliver the virtual conference site attributes according to the situation. The delivery process of the virtual conference site attributes is shown in FIG. 5, which may include the following:

Step 501: Summon a multi-point conference.

Step 502: Judge whether the currently delivered conference site is a virtual conference site, and: if the currently delivered conference site is a virtual conference site, perform step 503; if the currently delivered conference site is a virtual conference site, perform step 505. The judging whether the currently delivered conference site is a virtual conference site may have various manners, which may specifically be: presetting some conference sites for the virtual conference sites, recording ID numbers of these conference sites in advance, subsequently checking whether the currently delivered ID numbers of the conference sites are recorded in advance, so as to judge whether the currently delivered conference site is a virtual conference site. That is, if the ID number of the currently delivered conference site is recorded in advance, it may be judged that the currently delivered conference site is a virtual conference site; and if the ID number of the currently delivered conference site is not recorded in advance, it may be judged that the currently delivered conference site is not a virtual conference site.

Step 503: Deliver the virtual conference site attributes of the virtual conference site.

Step 504: After the video conference terminal of each conference site receives the virtual conference site attributes, if the received virtual conference site attributes include the ID number of the virtual conference site, the ID number of the received virtual conference site is displayed correctly; and if the received virtual conference site attribute only includes the identity of the terminal in the virtual conference site, such as an MT number, the received MT number of the terminal is displayed correctly.

Step 505: Process normally according to an actual conference site (that is, a common conference site).

A communication channel for delivering the virtual conference site attributes between the video conference terminal and the MCU may be expanded on the existing conference communication channel (for example, H.245 conference control channel), and may also be a newly added non-standard channel, in which this processing manner may also be expanded to conference systems based on H.323, H.320, and SIP standard protocols.

After the video conference terminal receives the preset virtual conference site attributes, it is required to determine one virtual conference site attribute therefrom according to input of a user, so as to perform presentation of the virtual conference site subsequently. For the user, the conference control operation is performed according to the virtual conference site attributes, so the control operations of the virtual conference site are performed all directing to the whole of the virtual conference site, instead of directing to a certain video conference terminal of the virtual conference site.

During the implementation, for performing the presentation of the virtual conference site, the video conference terminal further needs to determine the virtual conference site control mode. The control mode of the virtual conference site controls the virtual conference site as a whole, which may specifically be broadcasting a conference site, may also be selecting a conference site, may further be de-broadcasting a conference site, or conference site mute/de-mute, conference site microphone mute/de-mute, giving floor to a conference site, free discussion, adding/deleting a conference site, calling/hanging up a conference site, ending a conference, requesting/releasing a chair, and the like. During the implementation, the video conference terminal may determine the virtual conference site control mode according to the input of the user.

After the video conference terminal determines the virtual conference site attribute and the virtual conference site control mode, it is required to, according to the determined virtual conference site attribute and the virtual conference site control mode, acquire one virtual conference site presentation mode in the preset virtual conference site presentation modes, and present a virtual conference site in the acquired virtual conference site presentation mode.

Under various control modes of the virtual conference site, the operation management station, the central control system, and the media processing device may all preset the virtual conference site presentation modes according to the virtual conference site attributes. During the implantation, the virtual conference site presentation modes preset by the three may be enabled at the same time, or one of them is enabled. The operation management station and the central control system are all specific examples of the foregoing virtual conference site preset apparatus. During implementation, various virtual conference site control modes are preset in the virtual conference site preset apparatus and/or media processing device. For different virtual conference site attributes and virtual conference site control modes, the virtual conference site preset apparatus and/or media processing device may preset corresponding virtual conference site presentation modes.

In the embodiment of the present invention, the operation management station presetting the virtual conference site presentation modes is taken as an example for illustration, and the situation of the central control system or the media processing device presetting the virtual conference site presentation modes is similar thereto. During the implementation, in addition to presetting the virtual conference site presentation modes, the operation management station and the central control system may further provide, according to the virtual conference site attributes, a setting and a control interface that are capable of installing the virtual conference site presentation modes, and deliver to the media processing device after finishing the setting.

During the implementation, the operation management station presetting the presentation mode for the virtual conference site may be classified into a virtual conference site presentation mode under a telepresence conference site and a virtual conference site presentation mode under a common conference site. The virtual conference site presentation mode under the telepresence conference site is more applicable to the multi-screen scenario of the telepresence conference site, so as to well present the virtual conference site. The virtual conference site presentation mode under the common conference site is mainly applicable to the scenario of presenting a virtual conference site of the common conference site, without considering the actual situation of multiple screens of the telepresence conference site.

Figure 6:
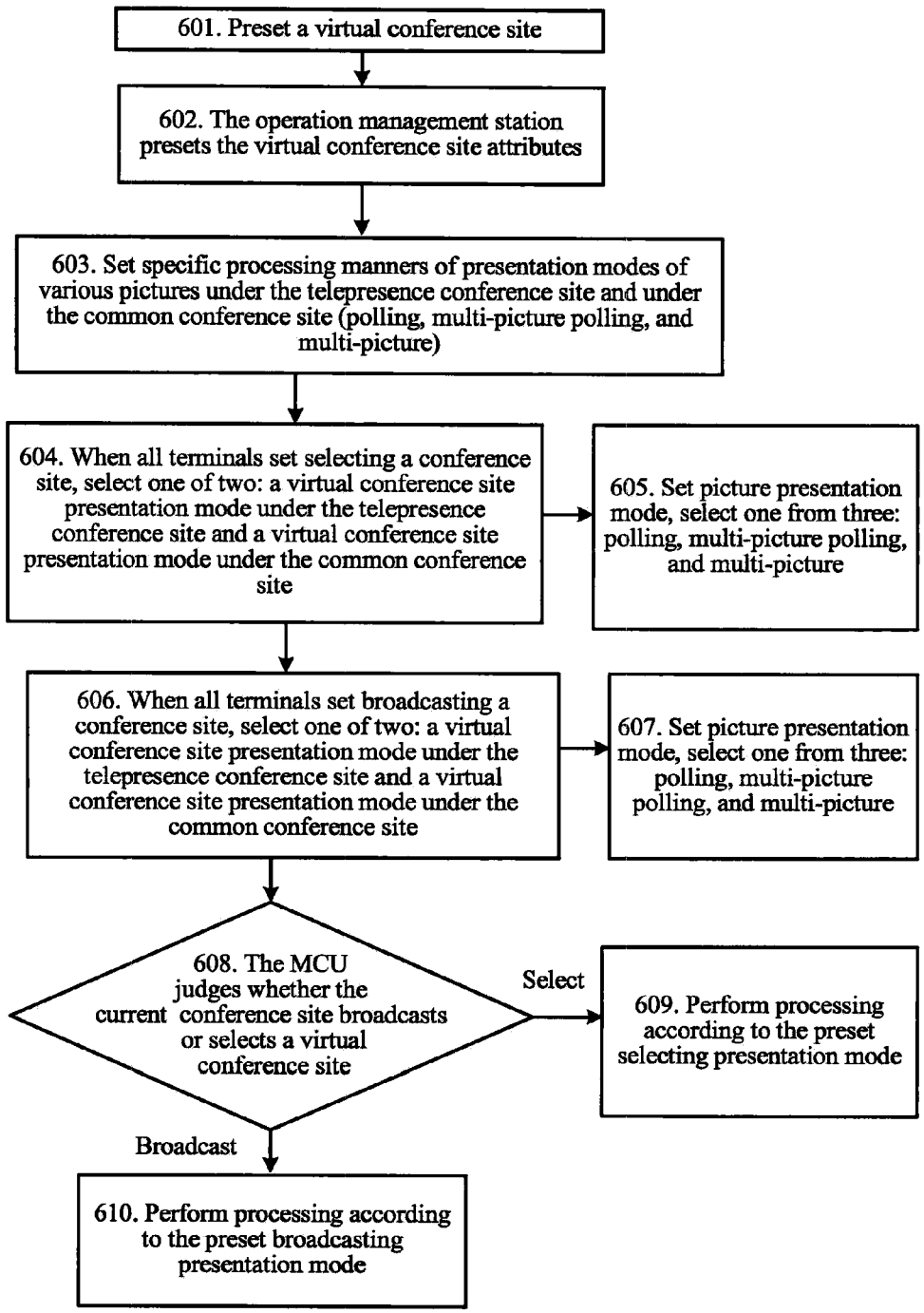
FIG. 6 is a schematic diagram of an operation management station presetting a virtual conference site in an embodiment of the present invention.

By taking the operation management station presetting the virtual conference site attributes and the virtual conference site presentation modes as an example, the virtual conference site attributes and the virtual conference site presentation modes are preset at the operation management station in advance, and the specific presetting is shown in FIG. 6, which may include the following:

Step 601: Preset a virtual conference site.

Step 602: The operation management station presets the virtual conference site attributes.

Step 603: Preset specific processing manners of presentation modes of various pictures under the telepresence conference site and under the common conference site, including polling, multi-picture polling, and multi-picture mode that will be mentioned later.

Step 604: When all terminals preset selecting a conference site, they perform presetting by selecting one of the virtual conference site presentation mode under the telepresence conference site and the virtual conference site presentation mode under the common conference site.

Step 605: When all terminals preset selecting a conference site, they perform the presetting by selecting one of polling, multi-picture polling, and multi-picture mode of the virtual conference site presentation mode under the preset telepresence conference site or of the virtual conference site presentation mode under the common conference site.

Step 606: When all terminals preset a broadcast conference site, they perform presetting by selecting one of the virtual conference site presentation mode under the telepresence conference site and the virtual conference site presentation mode under the common conference site.

Step 607: When all terminals preset a broadcast conference site, they perform the presetting by selecting one of polling, multi-picture polling, and multi-picture manner of the virtual conference site presentation mode under the preset telepresence conference site or of the virtual conference site presentation mode under the common conference site.

Step 608: The MCU judges whether the current conference site broadcasts a conference site or selects a conference site. If selecting a conference site, perform step 609; and if broadcasting a conference site, perform step 610.

Step 609: Perform processing according to the preset selecting presentation mode.

Step 610: Perform processing according to the preset broadcasting presentation mode.

Various presentation modes of the virtual conference site in FIG. 6 are illustrated in detail as follows:

(1) The Virtual Conference Site Presentation Mode Under the Telepresence Conference Site A telepresence conference site having 3 conference terminals and 3 display screens is taken as an example for illustration, which may be expanded to have N screens. Illustration is made by taking 5 virtual conference sites as an example, which may be expanded to M virtual conference sites. The following three presentation modes may be preset at the operation management station. The M and the N are independent from each other, and no limitation exists between magnitudes thereof.

Mode 1: Polling mode

This mode is characterized by considering the multi-screen feature of the telepresence conference site, and is classified into three kinds of polling modes.

Figure 7:
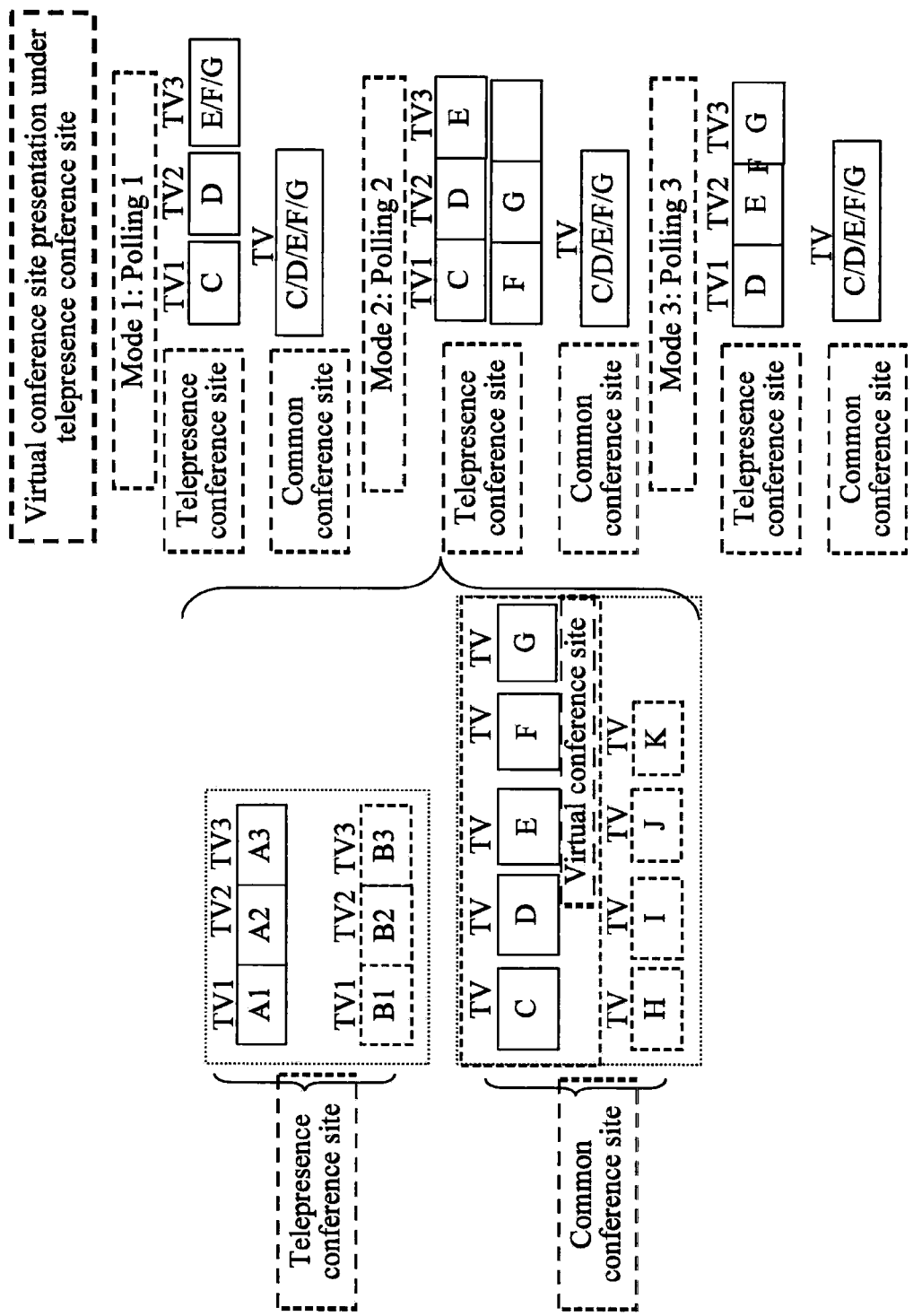
FIG. 7 is a schematic diagram of a polling presentation mode of a virtual conference site under a telepresence conference site in an embodiment of the present invention.

First kind: in the telepresence conference site, at least one screen displays a fixed virtual conference site, and other screens display other virtual conference sites by adopting the polling mode. In the telepresence conference site shown in FIG. 7, first 2 screens display the fixed virtual conference site, and the last screen displays other virtual conference sites by adopting the polling mode.

Second kind: in the telepresence conference site, the total number of screens is taken as a unit, and virtual conference sites of the total number are displayed each time, until all the virtual conference sites are displayed. In the telepresence conference site shown in FIG. 7, 3 screens are taken as a unit; 3 virtual conference sites are displayed at each time; the subsequent 3 virtual conference sites are then displayed at the next time; and the rest may be deduced through analog, until all are displayed.

Third kind: split joint all virtual conference sites into a whole image, and display the whole image on all screens of the telepresence conference site through image compression or stretching. In the virtual conference site shown in FIG. 7, pictures of M conference sites are formed into a whole image of the M conference sites through an image split jointing function of the MCU, and the image is full-screen displayed on N screens of the telepresence conference site through compressing and stretching of the image.

In the foregoing three modes, for the common conference sites, the virtual conference sites are displayed one by one in a sequential polling mode.

Mode 2: Multi-picture polling mode

Figure 8:
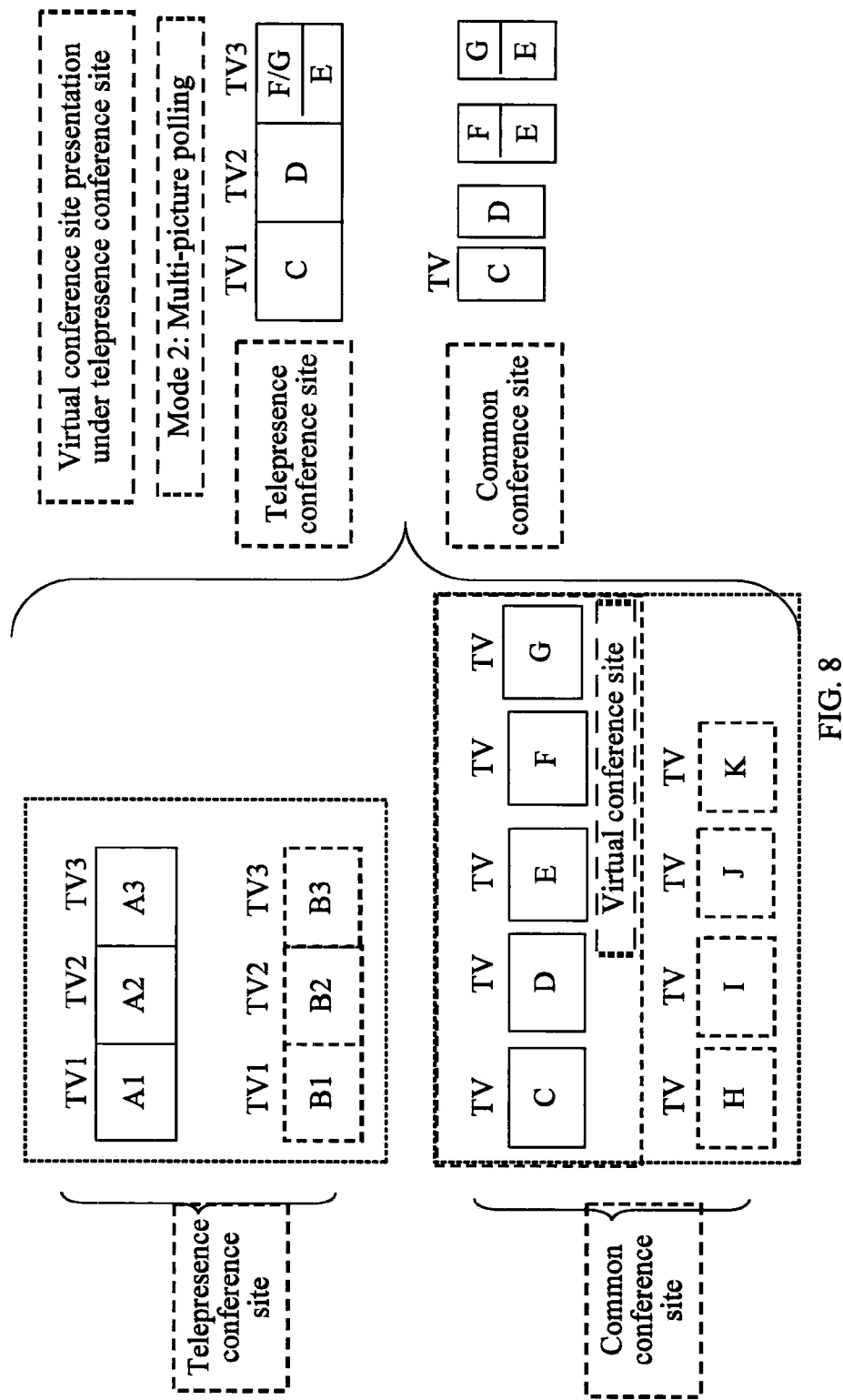
FIG. 8 is a schematic diagram of a multi-picture presentation mode of a virtual conference site under a telepresence conference site in an embodiment of the present invention.

This mode is characterized by considering the multi-screen feature of the telepresence conference site. In the telepresence conference site, at least one screen display a fixed virtual conference site, and other screens uniformly display other virtual conference sites by adopting the multi-picture polling mode. For example, as shown in FIG. 8, first 2 screens display fixed virtual conference sites, and the last screen uniformly display other virtual conference sites by adopting the multi-picture polling mode.

In this situation, considering the encoding/decoding processing capability of the MCU, in order to reduce the amount of encoding/decoding processing of the MCU as low as possible, the common conference site may display sequentially the virtual conference site of each screen in the telepresence conference site in the multi-picture polling mode. For example, as shown in FIG. 8, when the MCU processes (F, E), (G, E) encoding/decoding, the polling mode of the common conference site is that the C, D, (F, E), (G, E) are displayed sequentially in the multi-picture polling mode of the conventional video conference.

Mode 3: Multi-picture mode

Figure 9:
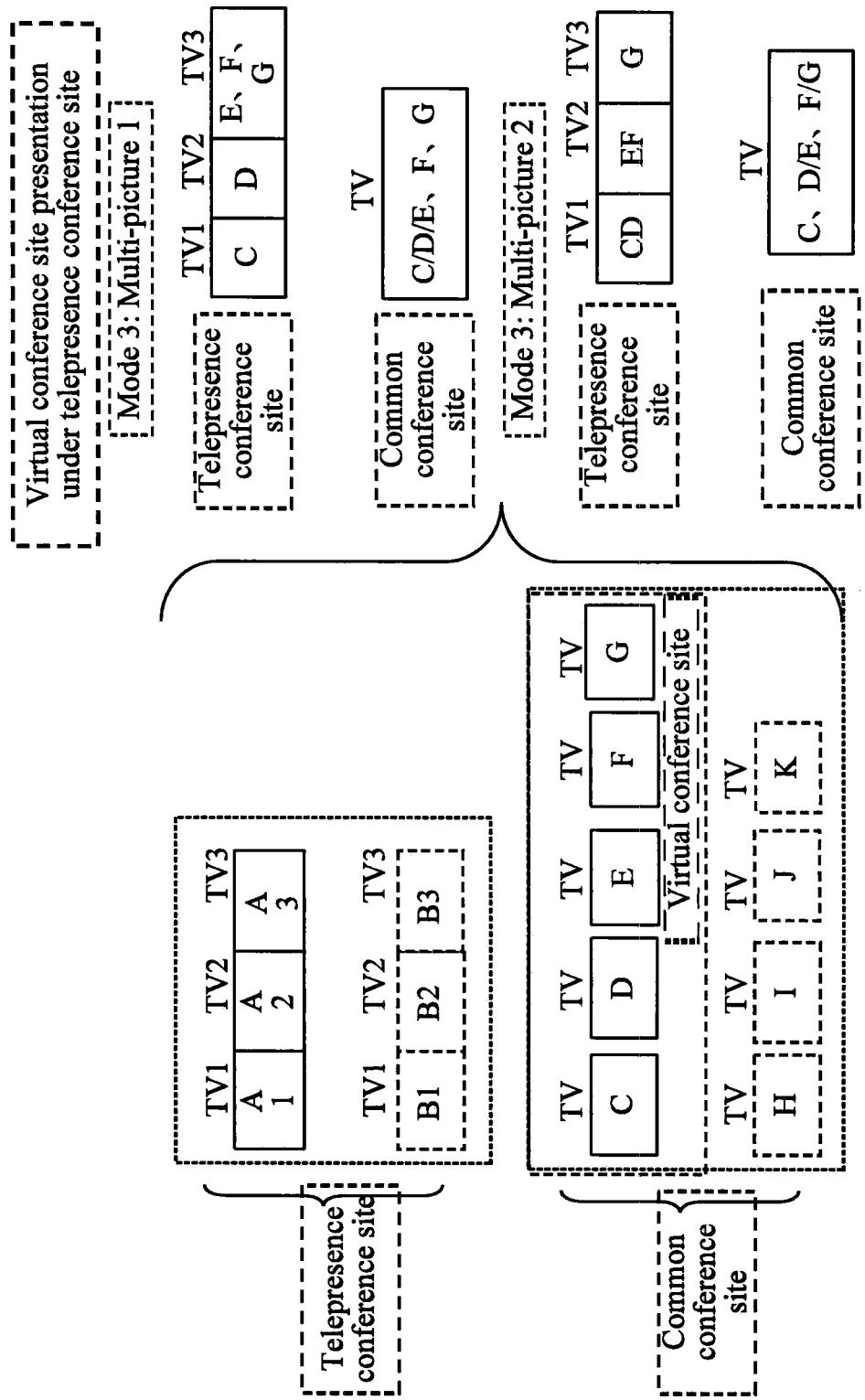
FIG. 9 is a schematic diagram of a multi-picture mode of a virtual conference site under a telepresence conference site in an embodiment of the present invention.

This mode is characterized by considering the multi-screen feature of the telepresence conference site. In the telepresence conference site, at least one screen display a fixed virtual conference site, and other screens uniformly display other virtual conference sites by adopting the multi-picture mode. As shown in FIG. 9, first 2 screens display fixed virtual conference sites, and the last screen displays other virtual conference site by adopting a multi-picture mode. In this situation, considering the encoding/decoding processing capability of the MCU, in order to reduce the amount of encoding/decoding processing of the MCU as low as possible, the common conference site may display sequentially the virtual conference site of each screen in the telepresence conference site in the multi-picture mode. For example, as shown in FIG. 9, when the MCU processes (E, F, G) encoding/decoding, the multi-picture mode of the common conference site is that the C, D, (E, F, G) are displayed sequentially in the multi-picture mode of the conventional video conference.

Another multi-picture mode: in the telepresence conference site, the total number of screens is taken as a unit, and multiple virtual conference sites are displayed averagely. As shown in FIG. 9, 3 screens are taken as a unit, and multiple virtual conference sites are displayed averagely. In this situation, considering the encoding/decoding processing capability of the MCU, in order to reduce the amount of encoding/decoding processing of the MCU as low as possible, the common conference site may display sequentially the virtual conference site of each screen in the telepresence conference site in the multi-picture mode. For example, as shown in FIG. 9, when the MCU processes (C, D), (E, F) encoding/decoding, the multi-picture mode of the common conference site is that the (C, D), (E, F), G are displayed sequentially in the multi-picture mode of the conventional video conference.

During the implementation, the control of the virtual conference site mainly includes: broadcasting a conference site, selecting a conference site, screen image switching, and the like. For the user, the forgoing operations are performed all directing to the whole of the virtual conference site, instead of directing to a certain terminal of the virtual conference site.

As described in the foregoing, when providing selecting or broadcasting presentation of a certain virtual conference site, a telepresence sub-conference site may present the scenario of the virtual conference site intelligently according to screen resource situation of the telepresence conference site, and the user may view bigger or more video images of the virtual conference site with more screens, thereby enhancing the video experience and communication effect of the users, and improving the use value of the system.

(2) The Virtual Conference Site Presentation Mode Under the Common Conference Site This presentation mode mainly considers the scenario of presenting the virtual conference site in the common conference site, without considering the actual situation of multiple screens of the telepresence conference site. Specifically, this mode may also be classified into three presentation modes:

Mode 1: Polling mode

This mode is the same as the virtual conference site presentation mode under the telepresence conference site as described in the foregoing.

Mode 2: Multi-picture polling mode

Figure 10:
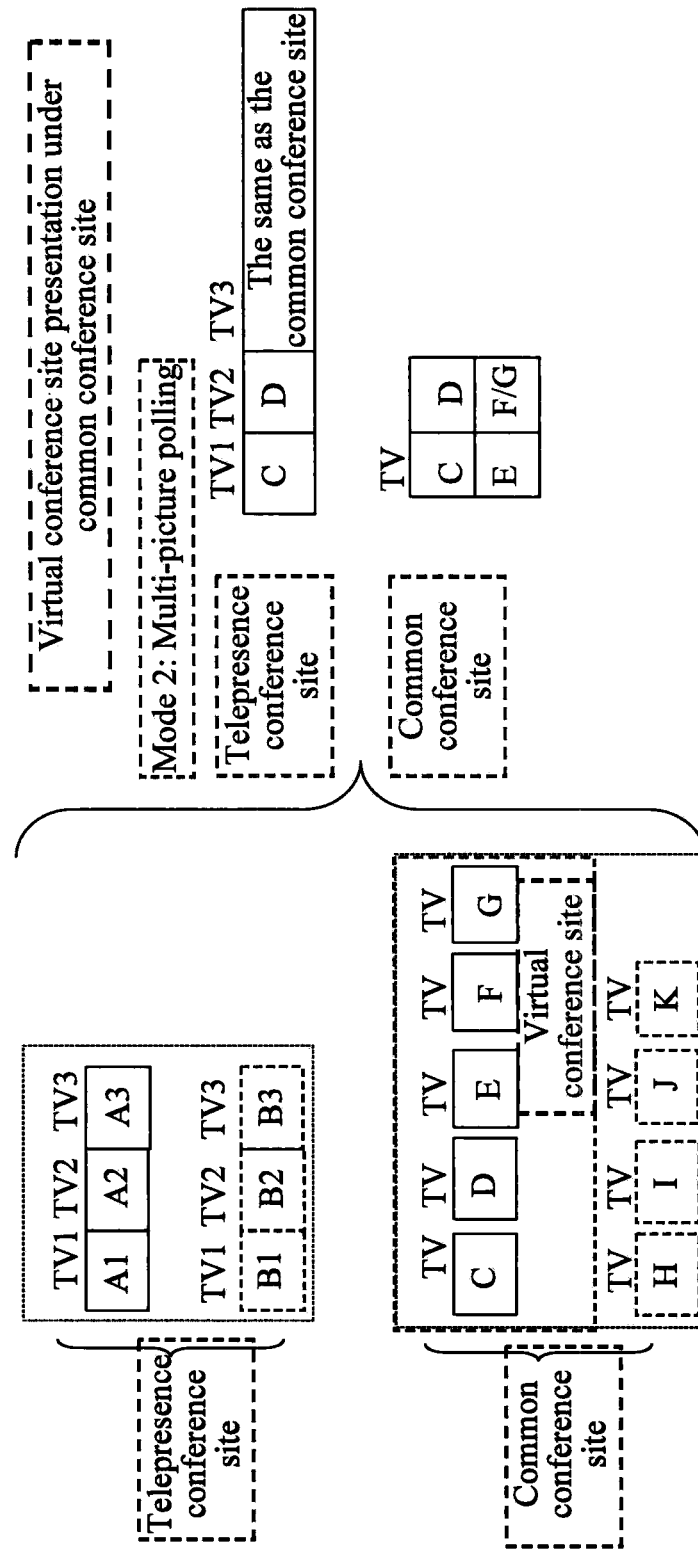
FIG. 10 is a schematic diagram of a multi-picture presentation mode of a virtual conference site under a common conference site in an embodiment of the present invention.

The common conference site displays all virtual conference sites in the multi-picture polling mode. In the telepresence conference site, one screen displays a virtual conference site the same as the common conference site, and other screens display the virtual conference site randomly. As shown in FIG. 10, the multi-picture polling mode of the common conference site is the multi-picture polling mode of the conventional video conference, in which C, D, E, and (F, G) are displayed through multiple pictures, where sub-pictures of F and G conference sites are displayed in the pooling mode.

The multi-picture polling mode of the telepresence conference site is that, a certain screen (for example, the last screen TV3) may be designated to display the scenario the same as that of the common conference site TV, and other two screens may randomly select C, D, E, F, and G conference sites for viewing.

Mode 3: Multi-picture mode

Figure 11:
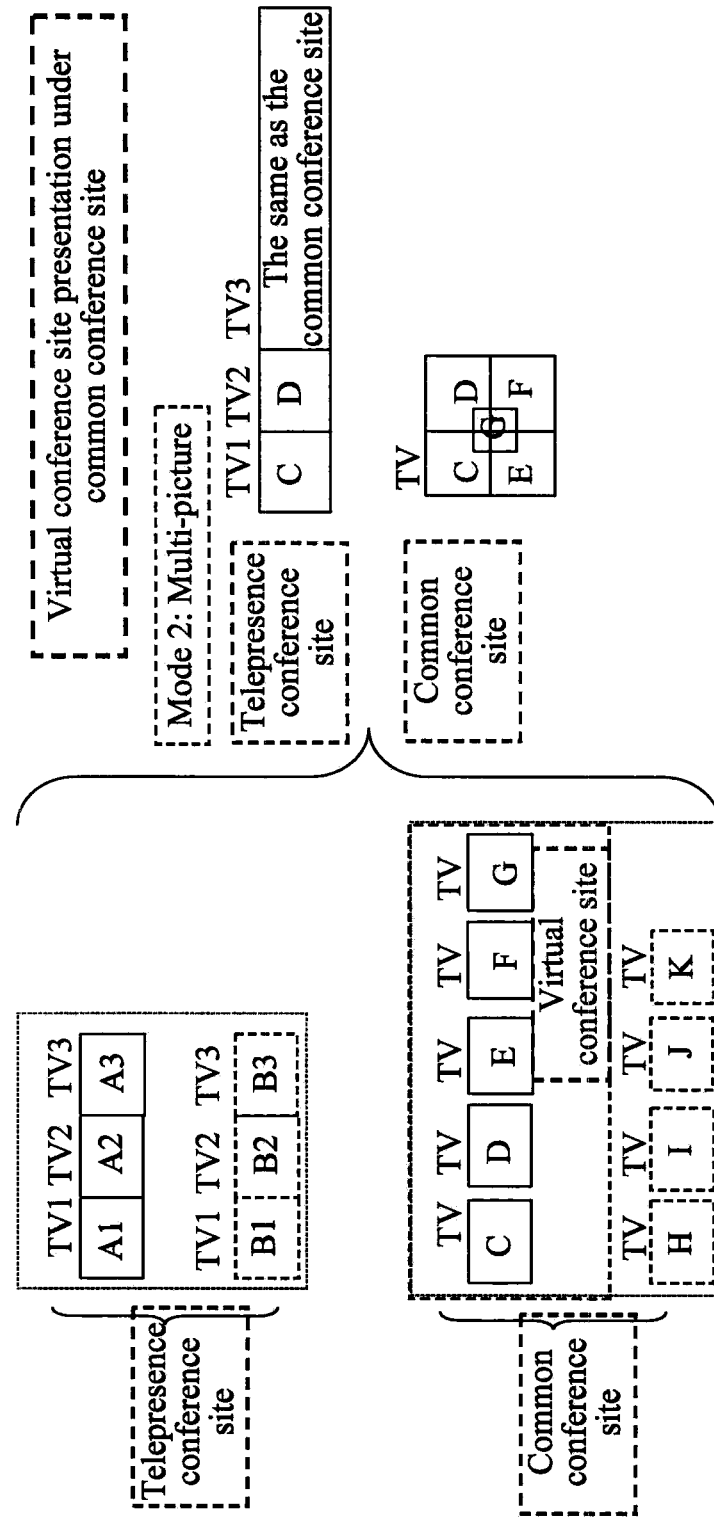
FIG. 11 is a schematic diagram of a multi-picture mode of a virtual conference site under a common conference site in an embodiment of the present invention.

The common conference site displays all virtual conference sites in the multi-picture mode. In the telepresence conference site, one screen displays a virtual conference site the same as the common conference site, and other screens display the virtual conference site randomly. As shown in FIG. 11, the multi-picture mode of the common conference site is the multi-picture mode of the conventional video conference, in which C, D, E, F, and G are displayed in multiple pictures.

The multi-picture polling mode of the telepresence conference site is that, a certain screen (for example, the last screen TV3) may be designated to display the scenario the same as that of the common conference site TV, and other two screens may randomly select C, D, E, F, and G conference sites for viewing.

As described in the foregoing, in the virtual conference site display mode under the common conference site, the telepresence conference site may also propose the interested conference site thereof, and have the freedom to use one screen to select to view a certain conference site of the virtual conference site.

If the virtual conference site preset apparatus presets the virtual conference site presentation modes, the video conference terminal, according to the determined virtual conference site attribute and the virtual conference site control mode thereof, acquires, from the virtual conference site preset apparatus, one virtual conference site presentation mode in the preset virtual conference site presentation modes through the media processing device, and presents a virtual conference site in the acquired virtual conference site presentation mode.

If the media processing device presets the virtual conference site presentation modes, after obtaining the preset virtual conference site attributes delivered by the virtual conference site preset apparatus, the media processing device, according to the preset virtual conference site attributes, and under various preset virtual conference site control modes, presets virtual conference site presentation modes; and the video conference terminal, according to the determined virtual conference site attribute and the virtual conference site control mode thereof, acquires, from the media processing device, one virtual conference site presentation mode in the preset virtual conference site presentation modes, and presents a virtual conference site in the acquired virtual conference site presentation mode.

By taking that the virtual conference site control mode determined by the video conference terminal is broadcasting a conference site as an example, a video conference terminal having the chair right may determine the required virtual conference site presentation mode according to the determined virtual conference site attribute and the virtual conference site control mode thereof, and then acquire the virtual conference site presentation mode from the operation management station through the MCU. Specifically, the video conference terminal having the chair right initiates a broadcast request to the MCU; the MCU forwards the broadcast request to the operation management station; the operation management station selects one virtual conference site presentation mode requested by the video conference terminal from the preset virtual conference site presentation modes and delivers it to the MCU; the MCU receives the virtual conference site presentation mode delivered by the operation management station and then forwards it to the video conference terminal; then the video conference terminal notifies the video conference terminal of each conference site of presenting the scenario of the virtual conference site in the received virtual conference site presentation mode.

By taking that the virtual conference site control mode determined by the video conference terminal is selecting a conference site as an example, the video conference terminal of each conference site initiates a selecting request to the MCU; the MCU selects one virtual conference site presentation mode requested by the video conference terminal from the preset virtual conference site presentation modes and delivers it to the video conference terminal; and the video conference terminal presents a virtual conference site in the received virtual conference site presentation mode, thereby implementing presenting the scenario of the virtual conference site at the conference site initiating the request. Definitely, in addition to the broadcasting a conference site and the selecting a conference site, the video conference terminal may also determine other virtual conference site control modes, and the network side may know the determined virtual conference site control mode thereof in a manner of sending a request.

In another embodiment, the media processing device, such as the multi-point control unit, is mainly responsible for implementing the method for presenting a virtual conference site of a video conference. This embodiment is characterized in that, the conference control operation directing to a certain conference site of the virtual conference site initiated by any common terminal is considered as the operation for the whole virtual conference site, and therefore existing conference terminal devices may be compatible, that is, the media processing device instructs the video conference terminal to, according to the determined virtual conference site attribute and the virtual conference site control mode, present all virtual conference sites in a group to which the virtual conference site requested for presentation belongs in the acquired virtual conference site presentation mode, and the specific implementation thereof includes the following:

The virtual conference site attributes preset on the operation management station include an ID of the virtual conference site, an MT number of a bound terminal in the virtual conference site, a number of a bound terminal in the virtual conference site, and the like. For example, the virtual conference site attribute is such defined to include a binding relationship of the conference sites at the same time, for example, a virtual conference site 1 (ID) M1 T1, M2 T2, M1 T3, and a virtual conference site 2 (ID) M1 T4, M1 T5, M3 T5. Then, summon a conference, and after the operation management station delivers the virtual conference site attributes to the MCU together, summon a conference including a multi-point virtual conference site.

On the operation management station, two modes: a real conference site control mode (that is, the common conference site control mode) and a virtual conference site control mode are defined, and the two modes may be switched to each other in the conference. The real conference site control mode is the same as the conventional video conference control mode, but under the virtual conference site control mode, the conference control operation directing to a certain conference site of the virtual conference site initiated by any common terminal is considered as the operation for the whole virtual conference site. For example, a virtual conference site 1 includes a conference site M1 T1, a conference site M2 T2, and a conference site M1 T3. When conference control operation for one of the conference sites such as the M1 T1 is performed, the conference control operation affects the virtual conference site 1. Other virtual conference site control modes including broadcasting a conference site and selecting a conference site, and the virtual conference site presentation modes including the virtual conference site presentation mode under the common conference site and under the telepresence conference site, are all the same as those in the foregoing embodiment.

In this embodiment, a conventional video conference terminal device is compatible.

In still another embodiment, the video conference terminal is mainly responsible for implementing the method for presenting a virtual conference site of a video conference. This embodiment is characterized in that, the control for the virtual conference site is implemented in the manner of sending M conference control commands directing to M conference sites of the virtual conference site by the video conference terminal directed to the system, and therefore, the conventional media processing device such as the MCU is compatible. That is, the video conference terminal receives at least two input conference control commands, on the basis of the at least two conference control commands and according to the determined virtual conference site attribute and the virtual conference site control mode, acquires one virtual conference site presentation mode in the preset virtual conference site presentation modes, and presents a virtual conference site in the acquired virtual conference site presentation mode. The number of the at least two conference control commands is consistent with the total number of the virtual conference sites in the group to which the virtual conference site requested for presentation belongs, and the specific implementation may include the following:

A conference terminal having the chair right presets, on an operation interface of a central control system thereof, information such as virtual conference site attributes, and virtual conference site terminals bound to the virtual conference site, and sends the information to the operation management station at the conference system network side through a site call signaling, and the operation management station summons a conference that includes a multi-point virtual conference site.

On the operation management station, two modes: a real conference site control mode and a virtual conference site control mode are defined, and the two modes may be switched to each other in the conference. The real conference site control mode is the same as the conventional video conference control mode, but under the virtual conference site control mode, the conference control operation directing to a certain conference site of the virtual conference site initiated by any common terminal is considered as the operation for the whole virtual conference site. At this time, the mode for the terminal to send to the system M conference control commands directing to M sub-conference sites of the virtual conference site, other virtual conference site control modes including broadcasting a conference site and selecting a conference site, and the virtual conference site presentation modes including the virtual conference site presentation mode under the common conference site and under the telepresence conference site, are all the same as those in the foregoing embodiment.

In this embodiment, the conventional MCU device is compatible.

Figure 12:
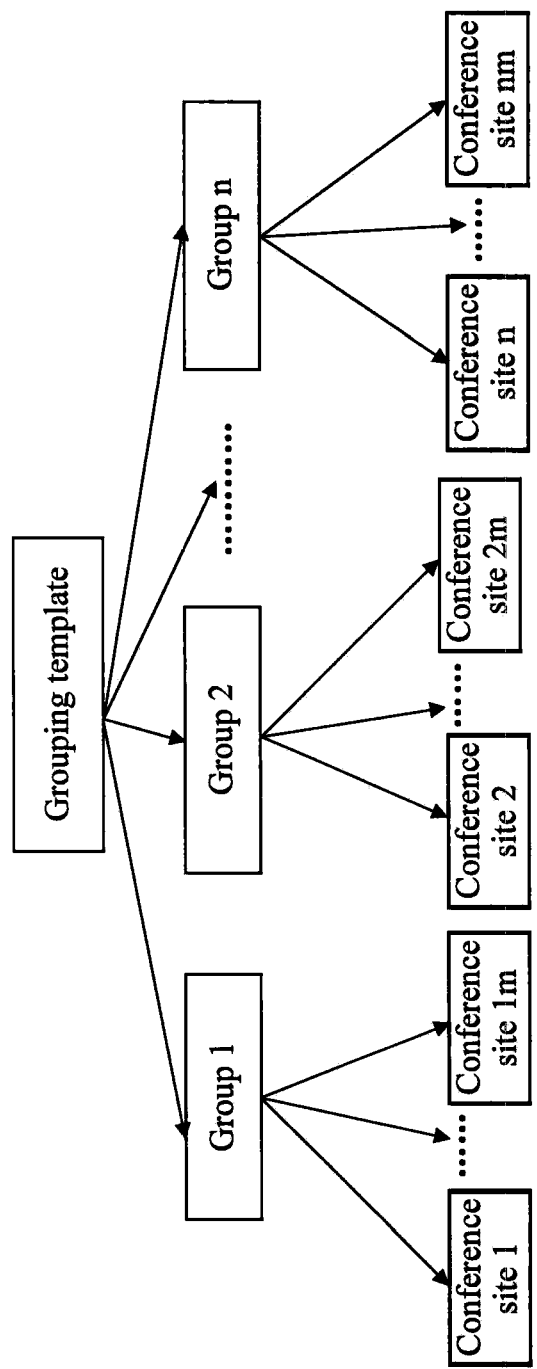
FIG. 12 is a schematic diagram of a grouping template in an embodiment of the present invention.

During specific implementation of the foregoing embodiments, when the user performs the conference control operation directing to a multi-point conference virtual conference site, it may be required to find the designated virtual conference site in a conference site list for performing the operation. However, when the number of the virtual conference sites is large, especially in a large-capacity conference, the difficulty in searching the conference site becomes large, which causes much inconvenience for the operation of the user. Therefore, the invention considers that the user may define a grouping template locally, and group, through the grouping template, all the virtual conference sites in the conference site list into several groups for display. In addition, the user may also designate the order of displaying the virtual conference sites in each group. In this way, all the virtual conference sites are displayed according to the manner designated by the user, and even if the number of the virtual conference sites is large, the user may also find the virtual conference site and perform the conference control operation conveniently. FIG. 12 shows a schematic diagram of the foregoing grouping template.

In one embodiment, when the grouping template is created by using a conference site name as an index, several groups may be defined in one template, and several virtual conference sites may be defined in one group. Group names in the same template are different from one another, and the conference site names are also different, thereby ensuring the uniqueness of the conference site.

When the template is defined, the conference site name in the template keeps consistent with the name of the remote conference site, namely, the conference site name in the conference site list. In a conference control list, remote conference site names are used to match the conference site names defined in the template, thereby achieving the objective of performing grouped display for the conference site list. At the same time, when the template is defined, a sorting sequence number may be designated for each virtual conference site, and the virtual conference sites in the same group may be sorted through the sequence numbers.

In one embodiment, in considering that the conference site name may be changed so that the remote conference site name and the virtual conference site name defined in the local grouping template are not consistent, a manner of creating a grouping template by taking numbers as indexes is further provided here. The manner defines numbers, instead of conference site names, in the grouping template.

Several groups may be defined in one template, and several virtual sub-conference sites may be defined in one group. Group names in the same template are different from one another, and the numbers are also different, thereby ensuring the uniqueness of the conference site. Then, perform matching for the virtual conference sites through numbers in the conference site list, thereby achieving the objective of grouped display. At the same time, when the template is defined, a sorting sequence number may be designated for each virtual conference site, and the virtual conference sites in the same group may be sorted through the sequence numbers.

In one embodiment, a manner of grouping according to the media processing device, such as the MCU to which the conference site belongs is further provided. In a cascaded conference, all virtual sub-conference sites having the same M numbers, that is, the MCU numbers, are in the same group. For the virtual sub-conference sites belonging to the same group, that is, the conference sites having the same M number, are sorted and displayed according to the conference site names or the conference site numbers.

The grouped displaying all the virtual sub-conference sites according to the conference site name, conference site number or media processing device to which the conference site belongs as described in the foregoing embodiments may be implemented by the operation management station, the central control system or the media processing device, which is capable of solving the problem of difficulty in searching the conference site when the user performs the conference control operation, thereby improving the charm quality of the products.

Those of ordinary skill in the art may understand that all or a part of the steps of the method according to the method embodiments of the present invention may be implemented by a program instructing relevant hardware. The program may be stored in a computer readable storage medium. When the program is run, all or a part of the steps of the method according to the embodiments of the present invention are performed. The storage medium may include: a ROM, a RAM, a magnetic disk, and an optical disk.

Embodiments of the present invention further provide a virtual conference site preset apparatus, a media processing device, a video conference terminal, and a video conference system, as described in the following embodiments. The principles for the devices and system to solve the problem are similar to those of the method for presenting a virtual conference site of a video conference, and therefore, for the implementation of the devices and system, reference may be made to the implementation of the method, and those repeated are not described here.

Figure 13:
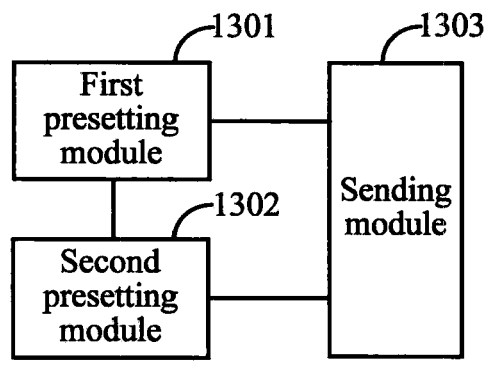
FIG. 13 is a schematic structure diagram of a virtual conference site preset apparatus in an embodiment of the present invention.

An embodiment of the present invention provides a virtual conference site preset apparatus, and a structure thereof is as shown FIG. 13, which may include:

a first presetting module 1301, configured to preset virtual conference site attributes, where the virtual conference site includes at least two conference terminals;

a second presetting module 1302, configured to, according to the preset virtual conference site attributes, and under various preset virtual conference site control modes, preset virtual conference site presentation modes; and a sending module 1303, configured to send the preset virtual conference site attributes and one virtual conference site presentation mode requested by a video conference terminal for acquisition in the preset virtual conference site presentation modes.

In an embodiment, the forgoing apparatus may further include:

a grouping module, configured to, according to a conference site name, a conference site number or a media processing device to which a conference site belongs, group all virtual conference sites.

In an embodiment, the forgoing apparatus may further include:

a sorting module, configured to designate a sorting sequence number for each virtual conference site, and perform sorting for virtual conference sites in the same group through the sorting sequence numbers.

In an embodiment, the forgoing apparatus may be an operation management station, and may also be a central control system.

Figure 14:
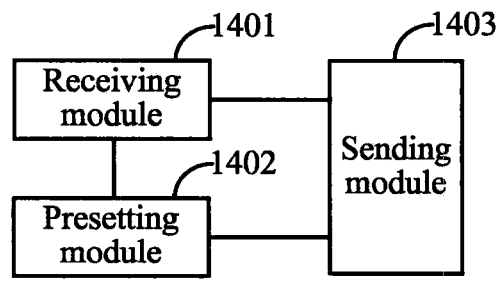
FIG. 14 is a schematic structure diagram of a media processing device in an embodiment of the present invention.

An embodiment of the present invention further provides a media processing device, and a structure thereof is as shown in FIG. 14, which may include:

a receiving module 1401, configured to acquire virtual conference site attributes preset by a virtual conference site preset apparatus, where the virtual conference site includes at least two conference terminals;

a presetting module 1402, configured to, according to the preset virtual conference site attributes, and under various preset virtual conference site control modes, preset virtual conference site presentation modes; and a sending module 1403, configured to send to a video conference terminal the preset virtual conference site attributes and one virtual conference site presentation mode requested by the video conference terminal for acquisition in the preset virtual conference site presentation modes.

In an embodiment, the forgoing media processing device may further include:

a controlling module, configured to instruct the video conference terminal, according to the determined virtual conference site attribute and the virtual conference site control mode, present all virtual conference sites in a group to which the virtual conference site requested for presentation belongs in the acquired virtual conference site presentation mode.

In an embodiment, the forgoing media processing device may further include:

a grouping module, configured to, according to a conference site name, a conference site number or a media processing device to which a conference site belongs, group all virtual conference sites.

In an embodiment, the forgoing media processing device may further include:

a sorting module, configured to designate a sorting sequence number for each virtual conference site, and perform sorting for virtual conference sites in the same group through the sorting sequence numbers.

Figure 15:
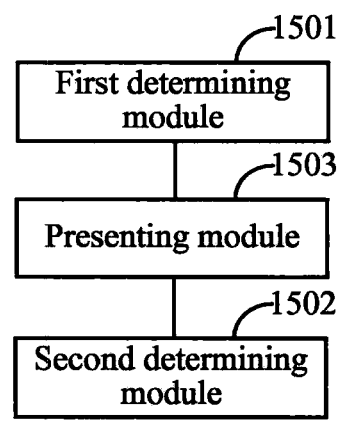
FIG. 15 is a schematic structure diagram of a video conference terminal in an embodiment of the present invention.

An embodiment of the present invention further provides a video conference terminal, and a structure thereof is as shown in FIG. 15, which may include:

a first determining module 1501, configured to receive preset virtual conference site attributes, and determine one virtual conference site attribute therefrom, where the virtual conference site includes at least two conference terminals;

a second determining module 1502, configured to determine a virtual conference site control mode; and a presenting module 1503, configured to, according to the determined virtual conference site attribute and the virtual conference site control mode, acquire one virtual conference site presentation mode in preset virtual conference site presentation modes, and present a virtual conference site in the acquired virtual conference site presentation mode.

In an embodiment, the presenting module is specifically configured to acquire one virtual conference site presentation mode in virtual conference site presentation modes preset by a virtual conference site preset apparatus or a media processing device.

In an embodiment, the first determining module is specifically configured to receive the virtual conference site attribute and display a virtual conference site identity; or receive an MT number of each conference site terminal and display the received MT number.

In an embodiment, the presenting module is specifically configured to receive at least two input conference control commands, and on the basis of the at least two conference control commands and according to the determined virtual conference site attribute and the virtual conference site control mode, present a virtual conference site in the preset virtual conference site presentation mode. The number of the multiple groups of conference control commands is consistent with the total number of the virtual conference sites in the group to which the virtual conference site requested for presentation belongs.

The presenting module performs the presentation of the virtual conference site, including that each conference site terminal accepts a code stream configured by the media processing device.

Figure 16:
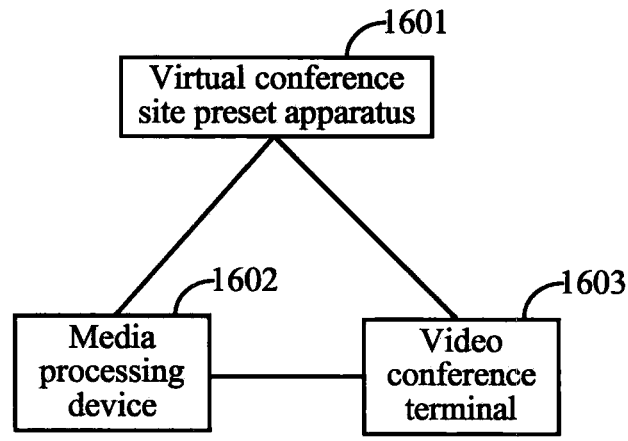
FIG. 16 and FIG. 17 are schematic structure diagrams of a video conference system in an embodiment of the present invention.

An embodiment of the present invention further provides a video conference system, and a structure thereof is as shown in FIG. 16, which may include:

a virtual conference site preset apparatus 1601, configured to: preset virtual conference site attributes, where the virtual conference site includes at least two conference terminals; according to the preset virtual conference site attributes, under various preset virtual conference site control modes, preset virtual conference site presentation modes; send the preset virtual conference site attributes; receive a request of a video conference terminal acquiring one virtual conference site presentation mode in the preset virtual conference site presentation modes forwarded by a media processing device, and send one virtual conference site presentation mode in the preset virtual conference site presentation modes requested by the video conference terminal; the apparatus may be an operation management station, and may also be a central control system;

the media processing device 1602, configured to: receive and forward to the video conference terminal a the preset virtual conference site attributes sent by the virtual conference site preset apparatus; receive the request of acquiring one virtual conference site presentation mode in the preset virtual conference site presentation modes sent by the video conference terminal and forward it to the virtual conference site preset apparatus; and forward the virtual conference site presentation mode sent by the virtual conference site preset apparatus; and the video conference terminal 1603, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode forwarded by the media processing device, and present a virtual conference site in the received virtual conference site presentation mode.

Figure 17:
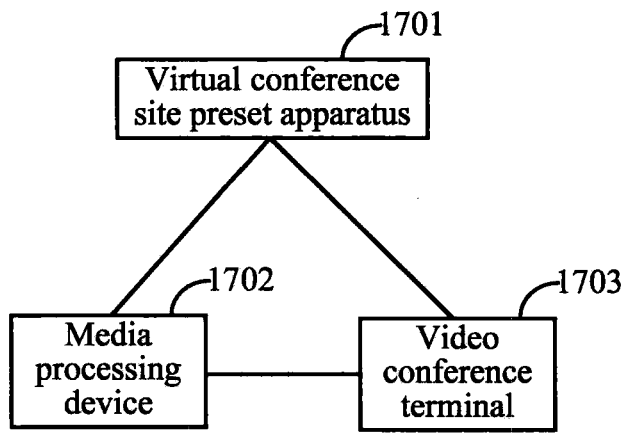

An embodiment of the present invention further provides a video conference system, and a structure thereof is as shown in FIG. 17, which may include:

a virtual conference site preset apparatus 1701, configured to preset virtual conference site attributes, where the virtual conference site includes at least two conference terminals; and send the preset virtual conference site attributes;

a media processing device 1702, configured to: receive the preset virtual conference site attributes and forward them to a video conference terminal; according to the preset virtual conference site attributes, and under various preset virtual conference site control modes, preset virtual conference site presentation modes; receive a request of the video conference terminal acquiring one virtual conference site presentation mode in the preset virtual conference site presentation modes, and send one virtual conference site presentation mode in the preset virtual conference site presentation modes requested by the video conference terminal; and the video conference terminal 1703, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode sent by the media processing device, and present a virtual conference site in the received virtual conference site presentation mode.

In the embodiments of the present invention, for the virtual conference site including at least two conference terminals, receive preset virtual conference site attributes and determine one virtual conference site attribute therefrom, the virtual conference site includes at least two conference terminals; determine a virtual conference site control mode; according to the determined virtual conference site attribute and the virtual conference site control mode, acquire one virtual conference site presentation mode in the preset virtual conference site presentation modes, and present a virtual conference site in the acquired virtual conference site presentation mode; thereby using the virtual conference site attribute to provide a conference control mode in which pictures of the virtual conference site are switched integrally. The operation is simple and convenient, so that the virtual conference site may be well presented, thereby providing a good experience for participators of the video conference.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the protection scope of the present invention.

What is claimed is:

1. A method for presenting a virtual conference site of a video conference, wherein the method comprises:
    receiving preset virtual conference site attributes, and determining one virtual conference site attribute therefrom, wherein the virtual conference site attribute comprises an identity of a virtual conference site and an identity of a bound terminal in the virtual conference site, and the virtual conference site comprises at least two conference terminals;
    determining a virtual conference site control mode; and
    according to the determined virtual conference site attribute and the virtual conference site control mode, acquiring one virtual conference site presentation mode in preset virtual conference site presentation modes, and presenting a virtual conference site in the acquired virtual conference site presentation mode.

2. The method according to claim 1, wherein the acquiring one virtual conference site presentation mode in the preset virtual conference site presentation modes comprises:
    acquiring one virtual conference site presentation mode in virtual conference site presentation modes preset by a virtual conference site preset apparatus or a media processing device preset.

3. A presentation method for a virtual conference site of a video conference, wherein the method comprises:
    acquiring virtual conference site attributes preset by a virtual conference site preset apparatus, and the virtual conference site comprises at least two conference terminals;
    according to the preset virtual conference site attributes, and under various preset virtual conference site control modes, presetting virtual conference site presentation modes; and
    sending to a video conference terminal the preset virtual conference site attributes and one virtual conference site presentation mode requested by the video conference terminal for acquisition in the preset virtual conference site presentation modes.

4. The method according to claim 3, wherein the virtual conference site presentation mode comprises:
    in a telepresence conference site, at least one screen displaying a fixed virtual conference site, other screens displaying other virtual conference sites by adopting a polling mode; in a common conference site, displaying virtual conference sites sequentially one by one in a polling mode;
    or, in a telepresence conference site, by using the total number of screens as a unit, displaying virtual conference sites of the total number each time, until all the virtual conference sites are displayed; in a common conference site, displaying virtual conference sites sequentially one by one through a polling mode;
    or, split jointing all virtual conference sites into a whole image, full-screen displaying the image on all screens of a telepresence conference site through image compression or stretching; in a common conference site, displaying virtual conference sites sequentially one by one through a polling mode;
    or, in a telepresence conference site, at least one screen displaying a fixed virtual conference site, other screens display other virtual conference sites by adopting a multi-picture polling mode; in a common conference site, displaying a virtual conference site of each screen in the telepresence conference site sequentially in a multi-picture polling mode;
    or, in a telepresence conference site, at least one screen displays a fixed virtual conference site, other screens display other virtual conference sites by adopting a multi-picture mode; in a common conference site, displaying a virtual conference site of each screen in the telepresence conference site sequentially in a multi-picture mode;
    or, in a telepresence conference site, by using the total number of screens as a unit, displaying multiple virtual conference sites averagely; in a common conference site, displaying a virtual conference site of each screen in the telepresence conference site sequentially in a multi-picture mode;
    or, in a common conference site, displaying all virtual conference sites in a multi-picture polling mode; in a telepresence conference site, one screen displaying a virtual conference site the same as the common conference site, and other screens displaying the virtual conference site randomly;
    or, in a common conference site, displaying all virtual conference sites in a multi-picture mode; in a telepresence conference site, one screen displaying a virtual conference site the same as the common conference site, and other screens displaying the virtual conference site randomly.

5. The method according to claim 3, further comprising:
    instructing the video conference terminal to, according to the determined virtual conference site attribute and the virtual conference site control mode, present all virtual conference sites in a group to which the virtual conference site requested for presentation belongs in the acquired virtual conference site presentation mode.

6. The method according to claim 3, further comprising:
    according to a conference site name, a conference site number or a media processing device to which the conference site belongs, grouping all virtual conference sites.

7. The method according to claim 6, further comprising:
designating a sorting sequence number for each virtual conference site, and performing sorting for the virtual conference sites in the same group through the sorting sequence numbers.

8. A virtual conference site preset apparatus, comprising:
a first presetting module, configured to preset virtual conference site attributes, and the virtual conference site comprises at least two conference terminals;
a second presetting module, configured to, according to the preset virtual conference site attributes, and under various preset virtual conference site control modes, preset virtual conference site presentation modes; and
a sending module, configured to send the preset virtual conference site attributes and one virtual conference site presentation mode requested by a video conference terminal for acquisition in the preset virtual conference site presentation modes.

9. The apparatus according to claim 8, further comprising:
a grouping module, configured to, according to a conference site name, a conference site number or a media processing device to which a conference site belongs, group all virtual conference sites.

10. The apparatus according to claim 9, further comprising:
a sorting module, configured to designate a sorting sequence number for each virtual conference site, and perform sorting for virtual conference sites in the same group through the sorting sequence numbers.

11. A media processing device, comprising:
an acquiring module, configured to acquire virtual conference site attributes preset by a virtual conference site preset apparatus, and the virtual conference site comprises at least two conference terminals;
a presetting module, configured to, according to the preset virtual conference site attributes, and under various preset virtual conference site control modes, preset virtual conference site presentation modes; and
a sending module, configured to send to a video conference terminal the preset virtual conference site attributes and one virtual conference site presentation mode requested by the video conference terminal for acquisition in the preset virtual conference site presentation modes.

12. The media processing device according to claim 11, further comprising:
a controlling module, configured to instruct the video conference terminal, according to the determined virtual conference site attribute and the virtual conference site control mode, present all virtual conference sites in a group to which the virtual conference site requested for presentation belongs in the acquired virtual conference site presentation mode.

13. The media processing device according to claim 11, further comprising:
a grouping module, configured to, according to a conference site name, a conference site number or a media processing device to which a conference site belongs, group all virtual conference sites.

14. The media processing device according to claim 13, further comprising:
a sorting module, configured to designate a sorting sequence number for each virtual conference site, and perform sorting for virtual conference sites in the same group through the sorting sequence numbers.

15. A video conference terminal, comprising:
a first determining module, configured to receive preset virtual conference site attributes, and determine one virtual conference site attribute therefrom, and the virtual conference site comprises at least two conference terminals;
a second determining module, configured to determine a virtual conference site control mode; and
a presenting module, configured to, according to the determined virtual conference site attribute and the virtual conference site control mode, acquire one virtual conference site presentation mode in preset virtual conference site presentation modes, and present a virtual conference site in the acquired virtual conference site presentation mode.

16. The video conference terminal according to claim 15, wherein the presenting module is further configured to acquire one virtual conference site presentation mode in virtual conference site presentation modes preset by a virtual conference site preset apparatus or a media processing device.

17. A video conference system, comprising:
a virtual conference site preset apparatus, configured to: preset virtual conference site attributes, and the virtual conference site comprises at least two conference terminals; according to the preset virtual conference site attributes, under various preset virtual conference site control modes, preset virtual conference site presentation modes; send the preset virtual conference site attributes; receive a request of a video conference terminal acquiring one virtual conference site presentation mode in the preset virtual conference site presentation modes forwarded by a media processing device, and send one virtual conference site presentation mode in the preset virtual conference site presentation modes requested by the video conference terminal;
the media processing device, configured to: receive and forward to the video conference terminal the preset virtual conference site attributes sent by the virtual conference site preset apparatus; receive the request of acquiring one virtual conference site presentation mode in the preset virtual conference site presentation modes sent by the video conference terminal and forward it to the virtual conference site preset apparatus; and forward the virtual conference site presentation mode sent by the virtual conference site preset apparatus; and
the video conference terminal, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode forwarded by the media processing device, and present a virtual conference site in the received virtual conference site presentation mode.

18. A video conference system, comprising:
a virtual conference site preset apparatus, configured to preset virtual conference site attributes, and the virtual conference site comprises at least two conference terminals; and send the preset virtual conference site attributes;
a media processing device, configured to: receive the preset virtual conference site attributes and forward them to a video conference terminal; according to the preset virtual conference site attributes, under various preset virtual conference site control modes, preset virtual conference site presentation modes; receive a request of the video conference terminal acquiring one virtual conference site presentation mode in the preset virtual conference site presentation modes, and send one virtual conference site presentation mode in the preset virtual conference site presentation modes requested by the video conference terminal; and the video conference terminal, configured to: receive the preset virtual conference site attributes and determine one virtual conference site attribute therefrom; determine a virtual conference site control mode; according to the determined virtual conference site attribute and the virtual conference site control mode, send the request of acquiring one virtual conference site presentation mode in the preset virtual conference site presentation modes; receive the virtual conference site presentation mode sent by the media processing device, and present a virtual conference site in the received virtual conference site presentation mode.

* * * * *